United States Patent
Hahn et al.

(10) Patent No.: US 9,786,038 B2
(45) Date of Patent: Oct. 10, 2017

(54) METHOD FOR PROCESSING AN IMAGE SEQUENCE HAVING CONSECUTIVE VIDEO IMAGES IN ORDER TO IMPROVE THE SPATIAL RESOLUTION

(75) Inventors: Marko Hahn, Neubiberg (DE); Markus Schu, Erding (DE); Harun Duan, München (DE)

(73) Assignee: Entropic Communications, LLC, Carlsbad, CA (US)

( * ) Notice: Subject to any disclaimer, the term of this patent is extended or adjusted under 35 U.S.C. 154(b) by 1911 days.

(21) Appl. No.: 12/139,877

(22) Filed: Jun. 16, 2008

(65) Prior Publication Data

US 2008/0309823 A1   Dec. 18, 2008

(30) Foreign Application Priority Data

Jun. 15, 2007 (DE) .................. 10 2007 027 642

(51) Int. Cl.
| | |
|---|---|
| H04N 5/00 | (2011.01) |
| G06T 5/00 | (2006.01) |
| H04N 5/14 | (2006.01) |
| H04N 7/01 | (2006.01) |
| H04N 5/232 | (2006.01) |

(52) U.S. Cl.
CPC ............. *G06T 5/003* (2013.01); *H04N 5/144* (2013.01); *H04N 7/012* (2013.01); *G06T 2207/10016* (2013.01); *G06T 2207/20012* (2013.01); *G06T 2207/20021* (2013.01); *G06T 2207/20201* (2013.01); *H04N 5/23264* (2013.01)

(58) Field of Classification Search
CPC .................................. H04N 5/23264
USPC .................................. 348/606, 607
See application file for complete search history.

(56) References Cited

U.S. PATENT DOCUMENTS

| 4,636,850 A | 1/1987 | Stewart |
| 5,089,887 A | 2/1992 | Robert et al. ................ 358/105 |

(Continued)

FOREIGN PATENT DOCUMENTS

| DE | 68919965 T2 | 6/1995 |
| DE | 102006051134 B4 | 2/2004 |
| EP | 1255241 B1 | 11/2003 |
| EP | 1770681 A1 | 4/2007 |
| WO | 2006025021 A1 | 3/2006 |

OTHER PUBLICATIONS

Schu et al., "System-on-Silicon Solution for High Quality HDTV Video Deinterlacing and Frame Rate Conversion for Flat Panel Displays," ADEAC 2005, Portland, USA, Oct. 25-27, 2005.

(Continued)

*Primary Examiner* — Michael Hong
(74) *Attorney, Agent, or Firm* — McAndrews, Held & Malloy, Ltd.

(57) ABSTRACT

An image sequence includes consecutive video images each exhibiting at least one image region having a number of pixels, where each pixel includes at least one intensity value. For each image a motion measure value is determined indicative of temporal change of a video content of the image region and varying the intensity values of the pixels of the image region relative to the associated intensity values from video image to video image, a measure for the variation of the intensity values being dependent on the motion measure value determined and the change in the intensity values relative to the associated intensity values being greater the larger the motion represented by the motion measure value.

16 Claims, 4 Drawing Sheets

(56) References Cited

U.S. PATENT DOCUMENTS

| | | | |
|---|---|---|---|
| 5,436,674 A * | 7/1995 | Hirabayashi et al. | 348/699 |
| 2003/0123551 A1 * | 7/2003 | Kim | H04N 5/145 375/240.16 |
| 2005/0232356 A1 * | 10/2005 | Gomi | H04N 5/145 375/240.16 |
| 2006/0072664 A1 | 4/2006 | Kwon et al. | 375/240.16 |
| 2006/0129566 A1 * | 6/2006 | Van Leest | G06T 1/005 |
| 2006/0280249 A1 | 12/2006 | Poon | |
| 2007/0041446 A1 | 2/2007 | Seong et al. | 375/240.16 |
| 2007/0071344 A1 * | 3/2007 | Ouzilevski | G06T 5/20 382/254 |
| 2007/0182687 A1 | 8/2007 | Kim et al. | 345/98 |
| 2008/0018783 A1 * | 1/2008 | Chen et al. | 348/402.1 |
| 2008/0111778 A1 * | 5/2008 | Shen | G09G 3/3611 345/87 |

OTHER PUBLICATIONS

Schu et al., "Frame Rate Conversion IC for 120 HZ Flat Panel Displays," Electronic Displays 2007, Nuremberg, Feb. 14-15, 2007.

Masahiro Baba et al., Software-Processed Edge- and Level-Adaptive Overdrive (SELAO) Method for High-quality Motion Picture, 2005 SID International Symposium, Boston, MA, May 24-27, 2005, pp. 1492-1495, Japan, XP007012332.

Michiel A. Klompenhouwer et al., "Motion blur Reduction for Liquid crystal Displays: Motion Compensated Inverse Filtering", Visual Communications and Image Processing, 2004, pp. 690-699, The Netherlands, XP030081331.

B.W. Lee et al., "Mastering the Moving Image: Refreshing TFT-LCDs at 120 Hz", SID Symposium Digest of Technical Papers, May 2005, pp. 1583-1585, vol. 36#1, South Korea.

\* cited by examiner

METHOD FOR PROCESSING AN IMAGE SEQUENCE HAVING CONSECUTIVE VIDEO IMAGES IN ORDER TO IMPROVE THE SPATIAL RESOLUTION

PRIORITY INFORMATION

This patent application claims priority from German patent application 10 2007 027 642.9 filed Jun. 15, 2007, which is hereby incorporated by reference.

BACKGROUND OF THE INVENTION

The present invention relates to video image processing, and in particular to processing of an image sequence having consecutive video images in order to improve the spatial resolution of video images having moving content or to reduce motion blur.

The representation of real processes by a video image sequence is inevitably associated with a loss of spatial and temporal resolution. Loss of spatial resolution occurs because only a limited number of pixels are available for representing a video image by display devices such as for example cathode-ray tubes, liquid-crystal displays (LCDs), plasma displays or projection systems. Loss of temporal resolution occurs because a video image sequence constitutes only a temporally discrete sequence of individual images having for example a frequency of 50 Hz or 100 Hz. A viewer is given the impression of a continuous representation because human perception is incapable of temporally resolving image sequences having an image frequency of more than 50 or 60 Hz.

The brightness of an object represented in an image sequence as perceived by a viewer corresponds to the integral of the luminous flux density or intensity of exposure over time. In temporally consecutive video images of the image sequence, an object moving continuously in reality appears at different positions within the individual images. Here human perception integrates the luminous flux intensity not only temporally but also spatially over the direction of motion of the object. The result is a perceived motion blur. Edges of the object that run transversely to the direction of motion and are represented sharply or in high contrast in the individual images appear blurred to the viewer. This blur is more pronounced the faster the object is moving—that is, the greater the distance between positions of the object in consecutive images—and the longer the object is exposed within an image. This effect is less pronounced with cathode-ray tubes, where each pixel of the image tube is exposed or sampled by the electron beam for only a short time, than with LCD screens, where a pixel is exposed for the full duration of an image. The blur effect is described in U.S. Patent Application 20060280249.

A known way of reducing this blurring effect is black frame insertion, that is, the insertion of a black image between two consecutive images. With LCD monitors this can be done by turning off the background illumination in interval-wise fashion. The result, however, is a reduction in image brightness.

The article entitled "*Mastering the Moving Image: Refreshing TFT-LCDs at 120 Hz,*" by B. W. Lee et al. SID '05, Digest, pages 1583-1585, discloses an image processing technique in which images of a 60 Hz image sequence are displayed repeatedly in order in this way to obtain a 120 Hz image sequence. One of the two like images here is represented brighter than the repeated original image; the other is represented darker than the repeated original image. This method can, however, lead to a perceived motion blur, particularly in the case of bright objects.

Another technique for reducing the blurring effect is to enhance the image resolution by interpolating, in motion-adapted or motion-compensated fashion, one or a plurality of intermediate images between two consecutive images of the initial image sequence. This procedure is described in the article entitled "*System-on-Silicon Solution for High Quality HDTV Video Deinterlacing and Frame Rate Conversion for Flat Panel Displays,*" by M. Schu et al., ADEAC 2005, Portland, U.S.A., Oct. 25-27, 2005, or in the article entitled "*Frame Rate Conversion IC for* 120 *Hz Flat Panel Displays,*" by M. Schu and P. Rieder, Electronic Displays 2007, Nuremberg, Feb. 14-15, 2007.

There is a need for improved processing of an image sequence having consecutive video images, where the processing reduces perceived blurring in the case of moving objects.

SUMMARY OF THE INVENTION

An aspect of the invention relates 'processing of an image sequence having consecutive video images each exhibiting at least one image region having a number of pixels each having an intensity value or brightness value or luminance value is associated. The processing determines a motion measure that provides a measure of the temporal change in video content of the image region, and for varying or changing intensity values of the pixels of the image region relative to the associated intensity values from video image to video image. A measure for the variation of the intensity values is dependent on the motion measure determined, and the change in intensity values relative to the associated intensity values is greater the larger the motion represented by the motion measure.

The intensity values may be varied so that they are increased in one image and decreased in the temporally subsequent image. A measure for the increase and decrease of the intensity values is dependent on the motion measure determined.

Insofar as the motion measure determined for an image region points to the presence of motion in the image region, the brightness of this image region varies from video image to video image, the brightness changes being more pronounced the greater the motion represented by the motion measure. The image region is thus represented brighter in one image than the intensity values associated with the pixels of the image region specify, and the image region is represented darker in a temporally previous or temporally subsequent image than the intensity values associated with the pixels of the image region specify. A brightness contrast that comes about for an image region between two consecutive video images is thus more distinct the greater the motion determined for the image region. As explained at the outset, perceived blurring is more pronounced the faster an object is moving in the represented video image sequence, that is, the greater the distance between the positions of the object in the individual images. The brightness contrast between individual image regions, which increases with increasing motion in the method explained, works against such perceived blurring.

The method explained is particularly suitable in conjunction with a motion-compensated interpolation method in which one or a plurality of intermediate images are interpolated between two temporally consecutive images of an image sequence. In such a method, a motion vector is determined for image regions of an intermediate image to be interpolated, and is employed for interpolating the video content of the relevant image region. Such a motion vector directly constitutes a motion measure, the motion being greater or stronger the larger the magnitude of the relevant motion vector.

An aspect of the invention also relates to processing an image sequence that exhibits original images and, between every two original images, at least one motion-compensated intermediate image having at least one image region, the at least one image region exhibiting a number of pixels with each of which at least one intensity value is associated. Provision is made in this method for determining a figure of merit of motion estimation of the at least one image region of the intermediate image and for varying the intensity values of the pixels of the image region of the intermediate image in dependence on the figure of merit determined. In case of "poor" motion estimation, the intensity values of the image region of the intermediate image can be diminished, so that the intermediate image recedes visually into the background to some extent or is less emphasized because of the lower intensity, so that errors of motion estimation are less salient.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
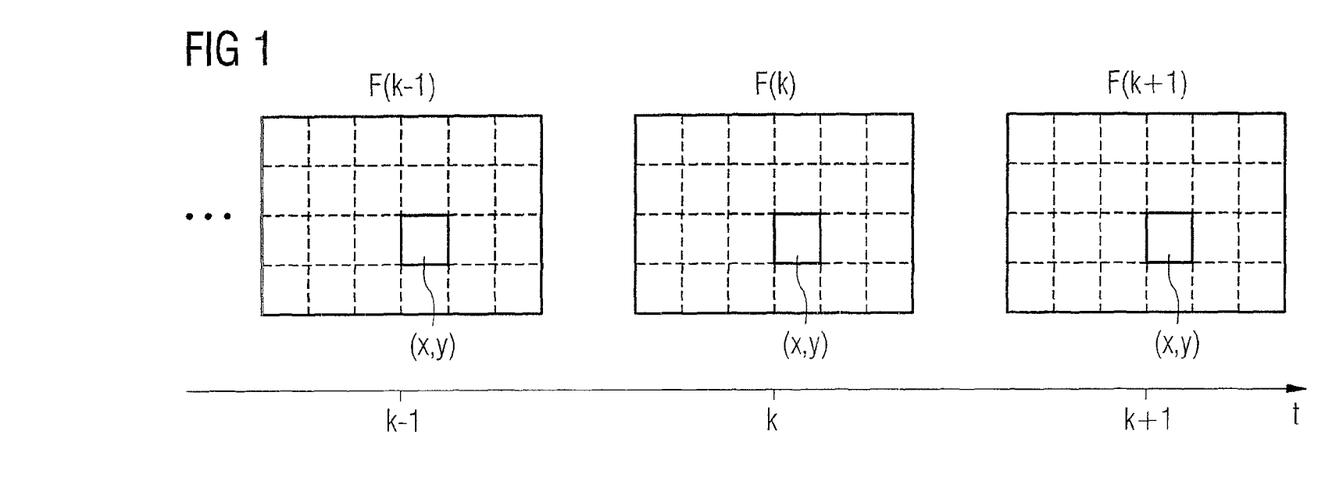
FIG. 1 pictorially illustrates a video image sequence having temporally consecutive video images, each of which is subdivided into a number of image regions.

FIG. 1 pictorially illustrates a temporal excerpt having three consecutive video images F(k−1), F(k), F(k+1) of such an image sequence. Here k denotes a temporal index. As illustrated in FIG. 1, the individual images are subdivided into a number of image regions arrayed in matrix fashion, which are depicted by dashed lines in FIG. 1. In these images an image region at an image region position (x,y) is illustrated by dotted-dashed lines, which image region will be examined more closely in what follows for purposes of explanation.

Figure 2:
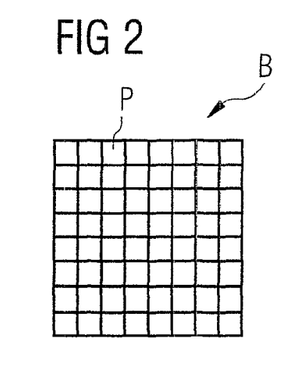
FIG. 2 pictorially illustrates the subdivision of an image region into a number of pixels, each having an intensity value or brightness value is associated.

With reference to FIG. 2, each of the image regions comprises a number of pixels P arrayed in matrix fashion, where each pixel has an associated video information value for representing a colored pixel having a specified intensity are associated. Depending on the color space employed, these video information values can be three so-called RGB values or three so-called YUV or YCbCr values. Each one of the three RGB values represents the intensity of one of the three primary colors red, green and blue employed for representing the pixel, while one of the three YUV values (Y value) represents the brightness or luminance of the pixel and the other two (U and V values) each represent a chrominance value. Depending on the color space employed, accordingly, three or just one intensity value is associated with one pixel. In what follows, the expression intensity value or brightness value denotes either an RGB value of the RGB color space or a luminance value of the YUV color space. The method explained in what follows can thus be applied in parallel to each of the three RGB values in the case of an RGB representation and only to the luminance value in the case of a YUV representation.

Thus an "image region" is a number of pixels at a definite position within the individual video images F(k−1), F(k), F(k+1). The intensity values associated with the pixels of the image region can change from image to image, and in dependence on whether the relevant image region represents a moving object or a stationary object.

Motion measures are determined for the individual image regions, and each motion measure contains, in passing, an item of information as to whether the relevant image region depicts a moving or a stationary object. In dependence on this motion measure determined for each image region, provision is made for modifying the brightness values associated with the pixels of the image region, specifically for example in such fashion that these brightness values are alternately increased and decreased from image to image relative to the associated brightness values.

In one embodiment, the motion measures are determined for the individual image regions for each video image F(k−1), F(k), F(k+1) of the image sequence. This motion measure is employed for modifying the intensity values associated with the pixels of the relevant image region, these modifications signifying alternately an increase and a decrease in the intensity value from image to image. In what follows, let x,y denote the position of an image region within the video images of the image sequence, let $L_i(x,y)$ denote the brightness value associated with one arbitrary pixel of this image region, and let V(x,y) denote a motion measure associated with the image region. Thus a modified brightness value $L_i'(x,y)$ of the pixel is described by $$L_i'(x,y)=L_i(x,y)\pm\Delta L_i(x,y), \text{ where } \Delta L_i(x,y)=f(V(x,y)). \qquad (1)$$

Here $\Delta L_i(x,y)$ denotes the measure by which the brightness value $L_i(x,y)$ associated with the pixel is modified. This modification measure $\Delta L_i(x,y)$, is a function of the motion measure determined for image region (x,y). The modification measure or the change relative to the originally associated brightness value is greater the stronger the motion represented by the motion measure.

Figure 3:
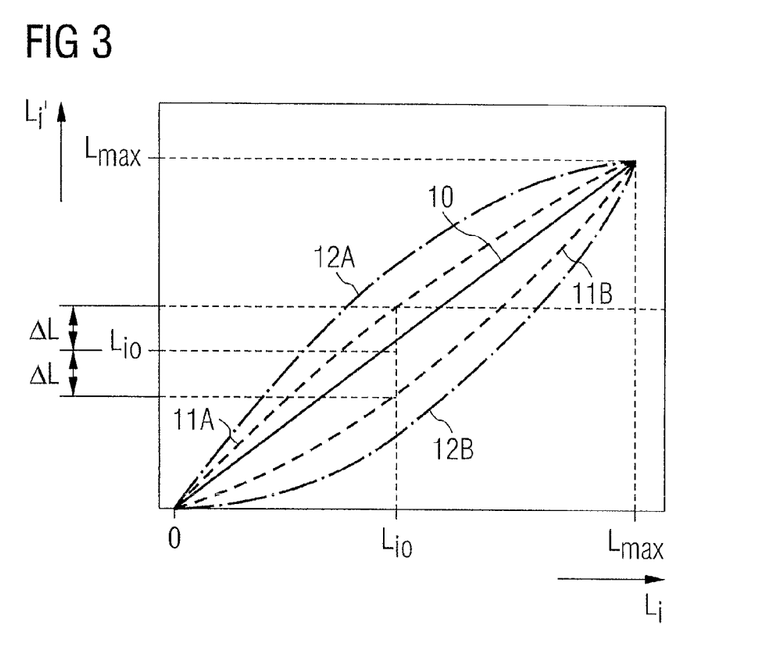
FIG. 3 illustrates an example of various mapping curves for motion-dependent mapping of an intensity value associated with a pixel onto an intensity value employed for representing the pixel.

FIG. 3 illustrates an example of mapping curves for mapping a brightness value $L_i$ associated with a pixel onto a modified brightness value $L_i'$. The solid line, which is plotted for purposes of comparison in FIG. 3, here represents the case where the intensity values $L_i$ are mapped unchanged onto the modified values $L_i'$, so that this curve, which is hereinafter referred to as the "identical mapping curve," is described by $L_i=L_i'$. A first mapping curve 11A represents the case where the modified brightness values $L_i'$ are increased relative to the originally associated brightness values $L_i$. A second mapping curve 11B associated with mapping curve 11A by which modified brightness values $L_i'$ decreased relative to the originally associated brightness values $L_i$ are obtained. One of the two first and second mapping curves 11A, 11B is here employed for modifying the intensity values of the pixels of an image region in a first image; the other of the two mapping curves is employed for modifying the intensity values of the pixels of the same image region in a second image temporally previous or temporally subsequent to the first image. In the example illustrated, these two mapping curves 11A, 11B are symmetric about the identical mapping curve 10 in such fashion that for a given intensity value the absolute value of the difference between this intensity value and an associated first modified intensity value lying on the first mapping curve 11A is equal to the absolute value of the difference between the given intensity value and an associated second modified intensity value lying on the second mapping curve 11B. This is illustrated for an intensity value $L_{i0}$ in FIG. 3. An intensity value associated with this intensity value $L_{i0}$ and lying on the first mapping curve 11A is described by $L_{i0}+\Delta L$, while a modified intensity value associated with the intensity value and lying on the second mapping curve 11B is described by $L_{i0}-\Delta L$. The sum of the intensity values obtained with this method for two consecutive images corresponds in this case to the sum of the originally associated intensity values.

The difference value $\Delta L$ by which the modified intensity values differ from the originally associated intensity value is, in the fashion explained, dependent on the motion measure of the image region in which the pixel having the associated intensity value lies. With reference to FIG. 3, this difference value or modification value $\Delta L$ can also be dependent on the absolute value of the relevant intensity value $L_i$. This difference value $\Delta L$ is largest for intensity values $L_i$ lying halfway between zero and a maximum possible intensity value Lmax. This difference value $\Delta L$ decreases in the direction toward the maximum intensity value Lmax and in the direction toward zero. The mapping curves 11A, 11B plotted in FIG. 3, which map the associated intensity values onto modified intensity values, are for example parabola branches. Under the constraints $L_i'(0)=0$ and $L_i'(Lmax)=L_{max}$, the "lower" mapping curve 11B is described by:

$$L_i'(L_i)=\alpha \cdot L_i^2+(1-\alpha \cdot L_{max}) \cdot L_i \quad (2a)$$

and the upper mapping curve 11A by:

$$L_i'(L_i)=-\alpha \cdot L_i^2+(130\ \alpha \cdot L_{max}) \cdot L_i. \quad (2b)$$

A variation in the intensity here takes place in dependence on the parameter a, the identical mapping curve being obtained for $\alpha=0$, that is, there being no variation in the intensity. The variation of the intensity is greater the larger the parameter c of the equations (2a) and (2b) representing the mapping curves.

Referring still to FIG. 3, two further mapping curves 12A. 12B lying farther away from mapping curve 10 than do the mapping curves 11A, 11B. which thus bring about a stronger modification o1 a given intensity than the mapping curves 11A, 11B and thus are employed for larger motion measures. The parameter $\alpha$ of the equations (2a), (2b) representing these curves is larger for these curves 12A, 128 than for the curves 11A, 11B.

The explained modification with an alternating increase and decrease in the intensity values produces an intensity contrast for the pixels of an image region between two consecutive images. This contrast is more marked the greater the distance between the mapping curves employed for modifying the intensity values.

FIG. 3 illustrates just two groups, each having two associated mapping curves 11A, 11B and 12A, 12B respectively, and the identical mapping curve. The identical mapping curve, which brings about no modification of the intensity value, is applied for example to image regions whose motion measures lie between zero and a specified first threshold value. The mapping curves of the first group are then applied to such image regions as have motion measures lying between the first threshold value and a second threshold value, while the mapping curves of the second group are applied to image regions having motion measures greater than the second threshold value. The use of only two groups having modified mapping curves is to be understood merely as an example. Naturally, in departure from the example explained, the value range of the motion measures can be subdivided into more than three intervals, of which the identical mapping curve is employed for motion measures from the value range containing zero and one group having two modified mapping curves is employed for motion measures from each of the remaining value ranges, the distance of these curves from the identical mapping curve increasing with increasing motion measure.

Figure 4:
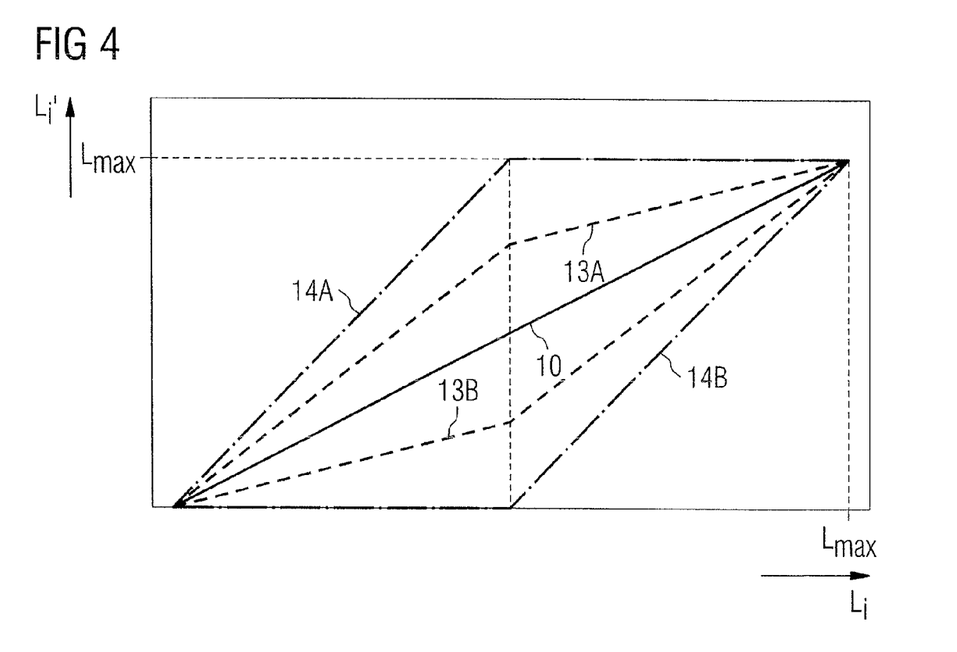
FIG. 4 illustrates an example of further mapping curves for mapping an intensity value associated with a pixel onto an intensity value employed for representing the pixel.

A further example of mapping curves for mapping an intensity value $L_i$ associated with a pixel onto a modified intensity value $L_i'$ is illustrated in FIG. 4. For comparison, FIG. 4 depicts the identical mapping curve 10 as a solid line, in correspondence with the illustration in FIG. 3. FIG. 4 illustrates mapping curves 13A, 13B of a first group of mapping curves, of which the first mapping curve 13A brings about an increase in the intensity values relative to the associated intensity values, and the second mapping curve 13B brings about a decrease in the intensity values relative to the associated intensity values. FIG. 4 also illustrates mapping curves 14A, 14B of a second group, of which a first curve 14A brings about an increase in the intensity values relative to the associated intensity values, while a second curve 14B brings about a decrease in the intensity values. The mapping curves plotted in FIG. 4 are each composed of two line segments. For intensity values smaller than a threshold value, the first mapping curves 13A, 14A of the two groups rise more steeply than the identical mapping curve and thereafter rise less steeply than the identical mapping curve 10 up to the maximum value Lmax. The second mapping curves 13B, 14B of the two groups rise less steeply than the identical mapping curve up to the threshold and thereafter more steeply than the identical mapping curve. The mappings effected by the first mapping curves are then described by:

$$L_i'=a \cdot L_i \text{ for } 0 \le L_{is} \le Ls, \quad (3a)$$

$$L_i'=b \cdot L_i \text{ for } Ls < L_{is} \le L_{max}. \quad (3b)$$

Here the slope factor a is greater than 1 while the slope factor b is less than 1. The first slope factor a is larger for the mapping curve 14A than for the mapping curve 13A, while the second slope factor b is smaller for the mapping curve 14A than the second slope factor for the mapping curve 13A.

The mapping effected by the second mapping curves 13B, 14B is described by:

$$L_i'=c \cdot L_i \text{ for } 0 \le L_{is} < Ls, \quad (4a)$$

$$L_i'=d \cdot L_i \text{ for } Ls < L_{is} < L \text{ max.} \quad (4b)$$

Here $L_{is}$ denotes the threshold value with, for example, $L_{is}=Lmax/2$. Slope factor c is less than 1, while slope factor d is greater than 1. For the mapping curves plotted in FIG. 4, a=d and b=c. This is not obligatory, however. In this connection it should be noted that the measure of the decrease in the intensity value in an image need not be equal to the measure of the increase in the intensity value in the subsequent or previous image, even though such equality is achieved by the mapping curves plotted in FIGS. 3 and 4.

Figure 5:
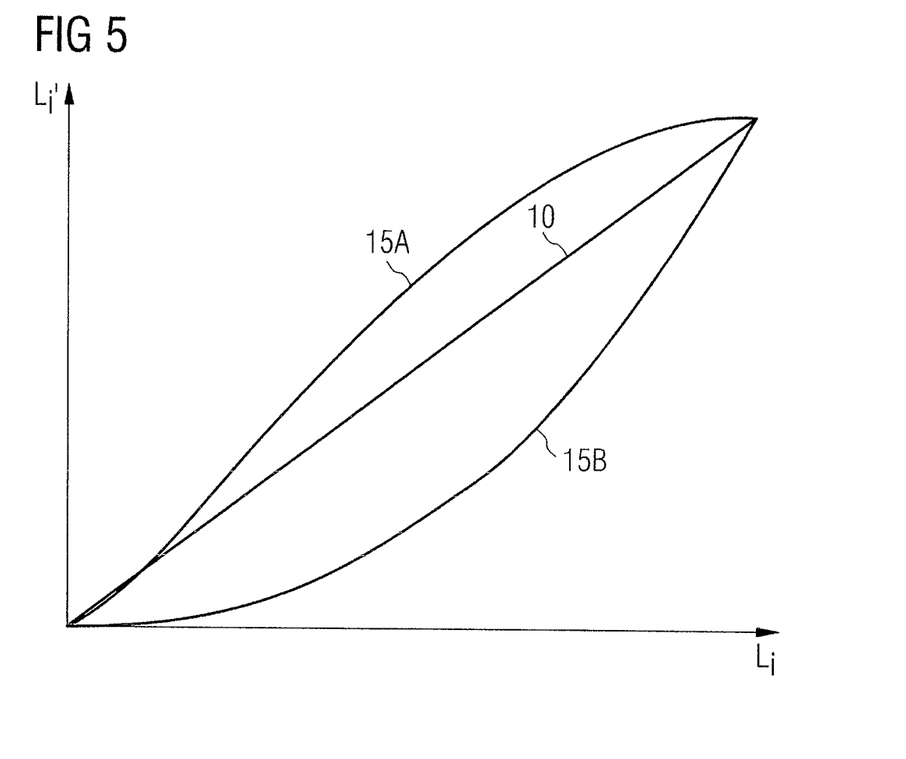
FIG. 5 illustrates mapping curves for mapping an intensity value associated with a pixel onto an intensity value employed for representing the pixel.

FIG. 5 depicts an example having two such mapping curves not symmetric with respect to the identical mapping curve 10. A first 15A of these mapping curves has a portion below the identical mapping curve 10 and a portion above the identical mapping curve 10, while a second 15B of these mapping curves is below the identical mapping curve for all associated intensity values $L_i$. In other words, there is a range of associated intensity values $L_i$, lying between zero and a specified threshold value, for which the intensity values are reduced in both consecutive images. For intensity values $L_i$ above this threshold value, modified intensity values for consecutive images are obtained by alternately increasing and decreasing the intensity values relative to associated intensity values. If both these curves are normalized to $L_{max}$ (so that the three normalized curves intersect at 1), the upper one 15A of the normalized curves in the example is described by:

$$L_i'=(0.4 \cdot L_i^2+0.6 \cdot L_i)^{1.8} \quad (5a)$$

and the lower 1 5B of the normalized curves by:

$$L_i'=(-L_i^2+2 \cdot L_i)^{1.4}. \quad (5b)$$

The increase and decrease of the intensity values of the pixels of an image region is dependent, in the fashion explained, on the motion measure determined for the relevant image region. There are various possibilities for determining this motion measure, of which several are explained in what follows by way of example.

In one embodiment, a motion measure for an image region is determined by finding pixel-by-pixel differences between pixel values of the pixels associated with the image region for two consecutive images of the image sequence and summing absolute values of these differences or even-numbered powers of these differences. For the purpose of explanation, consider image region (x,y) of image F(k). Hereinafter V(x,y,k) denotes a motion measure determined for this image region. On the basis of image F(k) and temporally subsequent image F(k+1), this motion measure is then determined as:

$$V(x, y, k) = \sum_i |P_i(x, y, k) - P_i(x, y, k + 1)|. \quad (6)$$

Here $P_i(x,y,k)$ denotes the video information values associated with the pixels of the image region in image F(k), while $P_i(x,y,k+1)$ denotes the video information values associated with the pixels of this image region in subsequent image F(k+1). In this connection, video information values can be either brightness values (luminance values) or chrominance values associated with the pixels. In equation (4) it is also possible to employ even-numbered powers of the differences instead of taking the absolute values.

The value of a motion measure determined with equation (4) is greater the more difference there is between the video information values associated with the pixels of the image region in the two consecutive images. The larger this motion measure, that is, the more the video information values associated with the pixels differ from one another, the greater the motion component of an object represented in the relevant image region of the image sequence.

In one embodiment, the motion measure determined with equation (4) for an image region is employed for two consecutive images, that is, the same motion measure serves as the parameter for the increase in the intensity values in one image and as the parameter for the decrease in the intensity values in the other image. In other words, the motion measure determined on the basis of the above-explained comparison of video information values is associated with image region (x,y) in the two images F(k), F(k+1) taken for the determination of the motion measure. For the exemplary embodiment explained above, this means that:

$$V(x,y,k+1)=V(x,y,k). \quad (7)$$

On grounds of stability, the motion measures associated with the image regions for the individual images can additionally be temporally and/or spatially filtered. To this end, for example with reference to the above-explained method, motion measures are first associated with the image regions of the individual images, which motion measures are then temporally and/or spatially filtered in order to associate with each of the image regions a filtered motion measure that is then employed for modifying the intensity values. For a temporally filtered motion measure $V^t(x,y,k)$ of image region (x,y) in image F(k), for example, $$V^t(x,y,k)=FI[V(x,y,k),V(x,y,k-1),V(x,y,k+1)]. \quad (8)$$

Here FI[.] denotes a filter function, for example a low-pass filter function, a median filter function or also a maximum function, which outputs as filter value the maximum of the filter values (which correspond to the values stated inside the square brackets), or a minimum function, which outputs as the filter value the minimum of the filter values. V(x,y,k−1) denotes the motion measure of image region (x,y) in image F(k−1) preceding image F(k). Correspondingly, V(x,y,k+1) denotes the motion measure of image region (x,y) in image F(k+1). The filter function explained with reference to equation (5) is to be understood merely as an example. It should be noted that temporal filtering of the motion measures can also span more than three consecutive images.

A spatially filtered motion measure for an image region is obtained by filtering, within one image, motion measures of at least several image regions disposed adjacent the image region under consideration. A spatially filtered motion measure $V^s(x,y,k)$ is described for example by:

$$V^s(x,y,k)=FI[V(x-i,y-j,k)|i=-1,0,1;j=-1,0,1]. \quad (9)$$

What are considered in filtering here are the motion measure initially associated with image region (x,y) and the motion measures of all image regions immediately adjoining this image region, that is, the image regions having coordinates (x,y+1), (x,y−1), (x−1,y−1), (x−1,y), (x−1,y+1), (x+1, y−1), (x+1,y), (x+1,y+1).

This also is to be understood merely as an example for spatial filtering. Thus for example it is also possible to consider only a few but not all of the image regions adjacent the image region under consideration. Furthermore, image regions not immediately adjoining the image region under consideration can also be taken into account in filtering. The filter function FI[.] of equation (6), in correspondence with the filter function of equation (5), is for example a low-pass filter function, a median filter function or a maximum or minimum filter function.

Naturally, temporal filtering and spatial filtering of the motion measures can also be combined to obtain a filtered motion measure for an image region. Thus for example it is possible to employ for filtering both the motion measures of those image regions that are disposed in the same images as the image region under consideration and those image regions that are disposed at the same position as the adjacent image region in temporally adjacent images. It is also possible to consider in temporally adjacent images those image regions whose position lies adjacent the position of the image region under consideration.

The above-explained method is suitable particularly in conjunction with a method for motion-compensated interpolation of intermediate images. In such a method, in which an intermediate image is inserted between two temporally consecutive images by interpolation, motion vectors associated with individual image regions of the intermediate image to be interpolated are determined. Techniques for determining motion vector value are well known. The motion vectors are required for interpolating the video content of the intermediate image. The motion vectors contain information about the motion of the video content in the image region under consideration. What can be employed as a motion measure is for example the magnitude of the motion vector associated with the image region. Here the motion measure is larger the longer the motion vector.

In the preceding explanation it was assumed that the images of the image sequence each exhibit a plurality of image regions whose intensity or brightness can be varied separately from each other. Alternatively it is possible to consider the entire image as one single image region and to vary the brightness of the overall image in dependence on the motion present in the overall image. A motion measure for the overall image can be determined for example with the use of the method explained with reference to equation (4).

Figure 6:
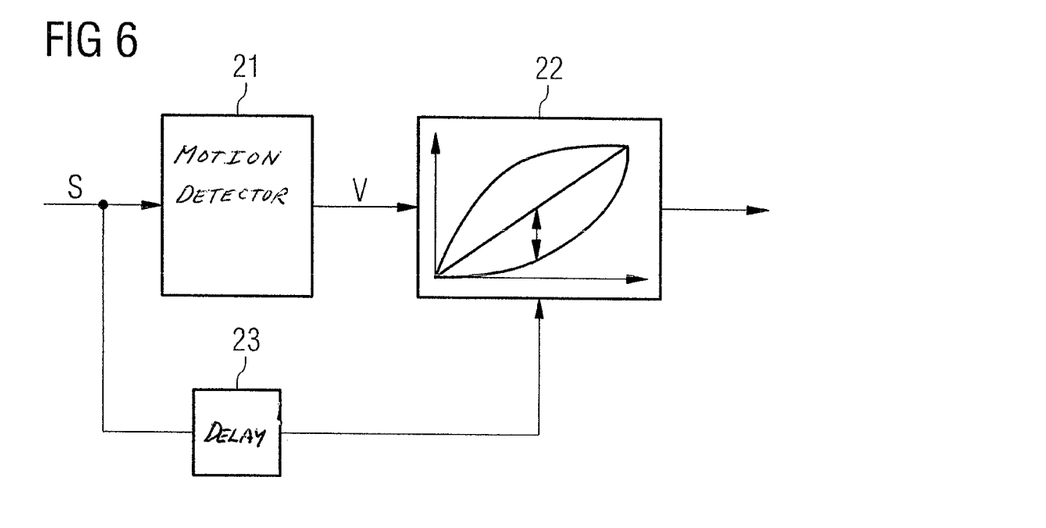
FIG. 6 is a block diagram illustration of an apparatus for image processing.

FIG. 6 illustrates an apparatus for performing the processing o he present invention. The apparatus comprises a motion-detection apparatus 21, to which a video signal S representing the video image sequence is supplied. This motion-estimating apparatus 21 determines motion measures V for individual image regions of the video image sequence represented by a video signal S. The video signal S and motion measures V available at the output of the motion-estimating apparatus 21 are supplied to a modification apparatus 22, which alternately increases and decreases the brightness values of the individual image regions in accordance with motion measures V. A delay element 23 delays the video signal S until the motion measures determined for the individual video images are present at the output of the motion-estimating apparatus.

In the preceding explanation it was assumed that a motion measure is determined for an image region under consideration and that intensity values of the pixels associated with this image region are varied with the use of this motion measure. A variant explained in what follows relates to a method in which, for image sequences having motion-compensated intermediate images, the intensity is varied in dependence on a quality of motion estimation.

Figure 7:
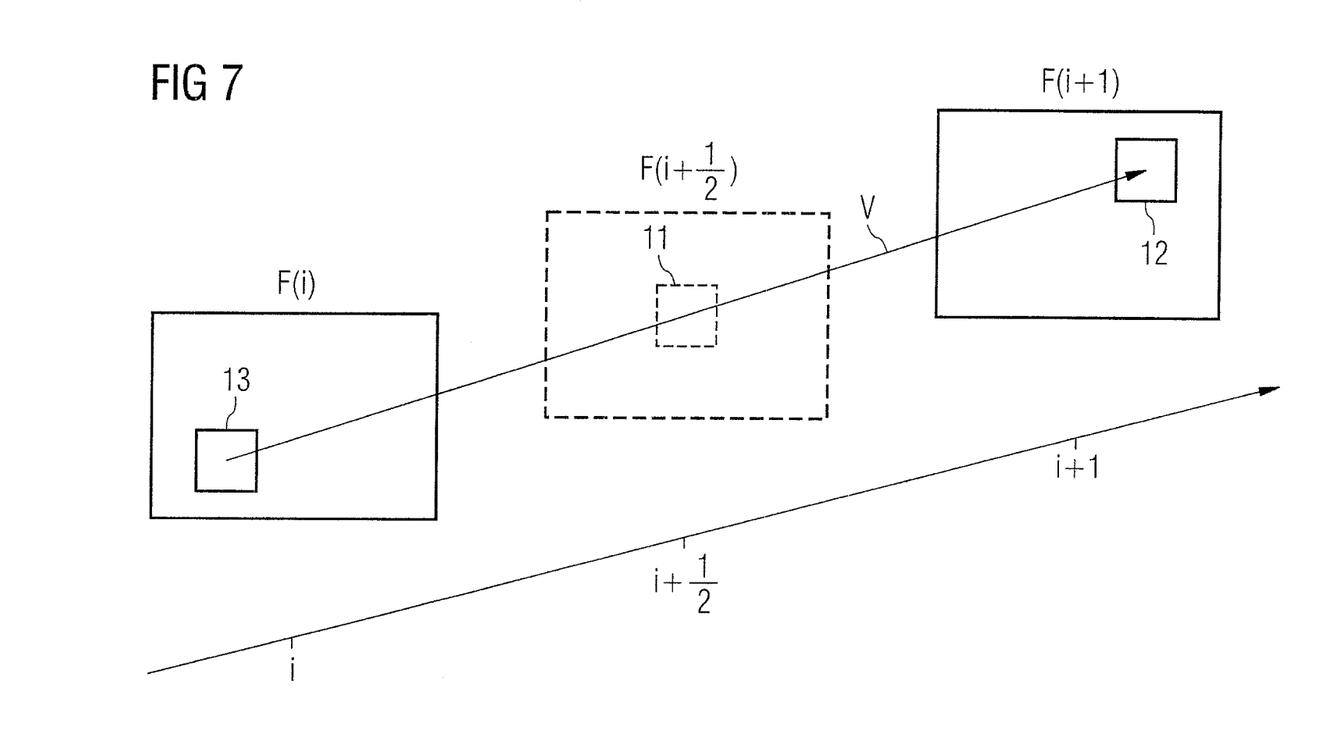
FIG. 7 illustrates in excerpted fashion an image sequence that exhibits a motion-compensated intermediate image between every two original images, for the purpose of explaining a variant of the image process method according to an aspect invention.

Motion-compensated intermediate images are generated by intermediate-image interpolation, in which an intermediate image is interpolated in motion-adapted fashion between two consecutive (original) images of an image sequence. In such intermediate-image interpolation, in sufficiently well-known fashion, motion vectors are associated with image regions of the image to be interpolated, and the image regions of the intermediate image are interpolated on the basis of these motion vectors. FIG. 7 illustrates a temporal excerpt of an image sequence resulting from such a method and having motion-compensated intermediate images. Here F(i) and F(i+1) denote original images of the image sequence. F(i+1/2) denotes an intermediate image to be interpolated in motion-adapted fashion between the two original images, which intermediate image lies for example halfway between the original images.

For motion-adapted interpolation of the intermediate image, motion vectors are determined for image blocks of intermediate image F(i+1/2). Reference character 11 denotes by way of example such an image block of the intermediate image, and V denotes a motion vector associated with this image block. This motion vector describes a motion direction from an image block 13 in image F(i) to an image block 12 in image F(i+1) and tells in what manner the content of the image block 13 moves from the image F(i) to the image F(i+1). Given ideal motion estimation, that is, given correctly determined motion, the contents of the image blocks 13, 12 lying at the initial point and at the final point of the motion vector coincide. The video contents of these image blocks 13, 12 lying at the initial point and at the final point of the motion vector are employed in known fashion for interpolating the video content of the image block 11 of the intermediate image F(i+1/2).

The determination of motion vectors for an image region of the intermediate image can contain errors, that is, a quality of estimation of the motion vectors or a quality of motion estimation can thus vary. A quality of motion estimation can be determined by comparing the video information values associated with the pixels of the image regions. For such a comparison, for example, the differences of these video information values are determined.

In an RGB representation, the video information values can be the intensity values of the three colors themselves. For a comparison of two pixels, the differences of the three color components can be determined for this purpose and the absolute values or even-numbered powers of the three differences can be summed. Alternatively, it is also possible to compare just one or two of the color components. The difference value so obtained for two pixels constitutes a comparison value for two pixels of the image regions. A comparison value of the image regions, and thus a measure for motion estimation, is obtained for example by summing the comparison values obtained for the individual pixels. In the case of a YUV representation, the video information values associated with the pixels and used for calculating the figure of merit can be the intensity values (Y values) and/or the chrominance values (U or V values).

In the ideal case, that is, given optimal motion estimation, the video content of the image region 13 at the initial point of the motion vector coincides with the video content of the image region 12 at the final point of the motion vector. The sum of the absolute values of the pixel differences is then zero.

In one embodiment, in an image sequence that comprises alternately an original image and an interpolated intermediate image, a quality of motion estimation for individual image regions of the intermediate image is determined, and for varying the intensity of the pixels of this image region in dependence on the quality of motion estimation. Given high quality of motion estimation, the intensity of the pixels of this image region should remain unchanged insofar as possible. If the quality of motion estimation is low, on the other hand, the intensity of the pixels of the interpolated image region is diminished while the intensity of the pixels of the corresponding image region to the subsequent original image is increased. Through a reduction in the intensity of such "poorly interpolated" image regions of an intermediate image, negative effects that can result from poor interpolation become less salient.

Although the present invention has been illustrated and described with respect to several preferred embodiments thereof, various changes, omissions and additions to the form and detail thereof, may be made therein, without departing from the spirit and scope of the invention.

What is claimed is:

1. A method for processing an image sequence having consecutive video images each exhibiting at least one image region having a number of pixels, at least one intensity value being associated with each pixel, the method comprising;
for each image region, determining a motion measure indicative of a temporal change of a video content of the image region; and
varying, from video image to video image, a plurality of displayed intensity values of the pixels of the image region relative to the associated intensity values, a measure for the variation of the displayed intensity values being dependent on the motion measure determined, and the change in the displayed intensity values relative to the associated intensity values being greater the larger the motion represented by the motion measure, wherein the displayed intensity values of the pixels are alternately increased to a first value greater than the associated intensity value and decreased to a second value less than the associated intensity value from video image to video image, wherein the change in the displayed intensity value relative to the associated intensity value is largest for the associated intensity value halfway between zero and a maximum possible associated intensity value.

2. The method of claim 1, wherein a common motion measure is determined for image regions that are located at the same position in two consecutive images, and wherein the displayed intensity values of the pixels of the image region are increased in one of the two images and decreased in the other of the two images.

3. The method of claim 1, wherein the determination of a motion measure for an image region of a video image comprises:
determining a first motion measure for the image region and determining a second motion measure for the same image region in at least one temporally subsequent or temporally previous image; and
filtering the first motion measure and the second motion measure in order to obtain the motion measure.

4. The method of claim 1, wherein intensity values for three colors are associated with each pixel and wherein at least one of the displayed intensity values is varied in dependence on the motion measure determined.

5. The method of claim 1, wherein a brightness value (luminance value) and two color values (chrominance value) are associated with each pixel and wherein the brightness value is varied in dependence on the motion measure determined.

6. The method of claim 2, wherein a measure by which the displayed intensity values are increased in the one image corresponds to a measure by which the displayed intensity values are diminished in the other image.

7. The method of claim 6, wherein the determination of a motion measure for an image region of a video image comprises:
determining a first motion measure for the image region and determining a second motion measure for at least one image region adjacent the image region; and
filtering the first motion measure and the second motion measure to obtain the motion measure.

8. The method of claim 3, wherein the filtering comprises low-pass filtering.

9. The method of claim 7, wherein the filtering comprises low-pass filtering.

10. The method of claim 4, wherein three displayed intensity values are varied for each pixel in dependence on the motion measure determined.

11. A method for processing an image sequence that, exhibits original images and, between every two original images, at least one motion compensated intermediate image having at least one image region, the at least one image region exhibiting a number of pixels, at least one intensity value being associated with each pixel, the method comprising:
determining a motion estimation quality value of the at least one image region of the intermediate image; and
adjusting a plurality of displayed intensity values of the pixels of the image region of the intermediate image by an amount that depends on the motion estimation quality value, wherein the displayed intensity values of the pixels is alternately increased to a first value greater than the associated intensity value and decreased to a second value less than the associated intensity value from video image to video image, wherein the change in the displayed intensity value relative to the associated intensity value is largest for the associated intensity value halfway between zero and a maximum possible associated intensity value.

12. The method of claim 11, wherein the displayed intensity values of the pixels of the image region of the intermediate image remain unchanged when the motion estimation quality value lies above a specified threshold value.

13. The method of claim 11, wherein a motion vector is associated with the at least one image region of the intermediate image, which motion vector exhibits an initial point and a final point, the initial point indicating a first image region in an image previous to the intermediate image and the final point indicating a second image region in an image subsequent to the intermediate image, the first image region and the second image region each exhibiting a number of pixels with each of which at least one video information value is associated, and wherein the determination of the motion estimation quality value comprises comparing the video information values associated with the pixels of the first and second image regions.

14. The method of claim 12, wherein the displayed intensity values of the pixels of the image region of the intermediate image are reduced relative to the associated intensity values when the motion estimation quality values lies below the specified threshold value.

15. The method of claim 14, wherein, for a motion estimation quality value below the threshold value, the displayed intensity values are diminished more, relative to the associated intensity values, the smaller the motion estimation quality value.

16. The method of claim 15, wherein, for a motion estimation quality value below the threshold value, the displayed intensity values of the image region are increased in an original image previous or subsequent to the intermediate image.

* * * * *